US008132243B2

(12) United States Patent
Bychkov

(10) Patent No.: US 8,132,243 B2
(45) Date of Patent: Mar. 6, 2012

(54) EXTENDED ONE-TIME PASSWORD METHOD AND APPARATUS

(75) Inventor: Eyal Bychkov, Hod Hasharon (IL)

(73) Assignee: SanDisk IL Ltd., Kfar Saba (IL)

( * ) Notice: Subject to any disclaimer, the term of this patent is extended or adjusted under 35 U.S.C. 154(b) by 1370 days.

(21) Appl. No.: 11/502,466

(22) Filed: Aug. 11, 2006

(65) Prior Publication Data

US 2007/0067828 A1    Mar. 22, 2007

Related U.S. Application Data

(60) Provisional application No. 60/707,203, filed on Aug. 11, 2005.

(51) Int. Cl.
*G06F 15/16* (2006.01)

(52) U.S. Cl. .......... 726/9; 726/3; 726/4; 726/5; 726/17; 726/20; 455/418; 455/424; 701/33; 713/182; 713/184; 713/185

(58) Field of Classification Search .......... 726/3–5, 726/17, 20; 455/418, 424, 416; 701/33; 713/182, 184–185
See application file for complete search history.

(56) References Cited

U.S. PATENT DOCUMENTS

| | | | |
|---|---|---|---|
| 6,141,752 A | | 10/2000 | Dancs et al. |
| 6,694,235 B2 * | | 2/2004 | Akiyama .................. 701/33 |
| 7,178,025 B2 * | | 2/2007 | Scheidt et al. ............. 713/168 |
| 7,270,276 B2 * | | 9/2007 | Vayssiere .................. 235/492 |
| 2001/0045451 A1 | | 11/2001 | Tan et al. |
| 2003/0046340 A1 * | | 3/2003 | Kung ..................... 709/203 |
| 2004/0123157 A1 | | 6/2004 | Alagna |
| 2005/0033703 A1 * | | 2/2005 | Holdsworth ............... 705/67 |
| 2006/0041759 A1 * | | 2/2006 | Kaliski et al. ............. 713/184 |
| 2006/0294023 A1 * | | 12/2006 | Lu ........................ 705/67 |

FOREIGN PATENT DOCUMENTS

AU    2004100268    5/2004

(Continued)

OTHER PUBLICATIONS

Enhancing One-Time Passwords (Whitepaper) for Protection Against Real-Time Phishing Attacks; RSA Security. Technology Backgrounder.

(Continued)

*Primary Examiner* — Thanhnga Truong
(74) *Attorney, Agent, or Firm* — Brinks Hofer Gilson & Lione/SanDisk

(57) ABSTRACT

An OTP token for facilitating the authorizing of a client workstation to conduct a session with a server over the Internet is disclosed. Information at least partially identifying the server is provided to the OTP token and/or the client workstation, and a determination is made, using this identifying information, if the server is a legitimate server. In accordance with this determination, it is decided whether or not to transmit data indicative of a session OTP from the OTP token to the client workstation. In some embodiments, if the identifying information is indicative of a legitimate server, the data indicative of the session OTP is transmitted from the OTP token to the client workstation, and otherwise, the data indicative of the session OTP is withheld from the client workstation. Data indicative of the session OTP may include, in various embodiments, either multi-factor authentication data derived from user authorization data, or session OTP data that is independent of user authentication data.

30 Claims, 10 Drawing Sheets

FOREIGN PATENT DOCUMENTS

| | | |
|---|---|---|
| JP | 2001-312477 | 11/2001 |
| WO | WO2005098630 | 10/2005 |
| WO | WO2006018647 | 2/2006 |
| WO | WO2006062838 | 6/2006 |

OTHER PUBLICATIONS

European Supplementary Search Report dated Jun. 22, 2011, for European Application No. 06780388.2, 6 pages.

Notification of Reasons of Rejection dated May 13, 2011, for Japanese Application No. 2008-525722, 7 pages.

Akinori Shiraga and five other, "A Study of User Authentication Method Using Cryptographic Conditional URI, The Institute of Electronics, Information and Communication Engineers, Technical Report" vol. 104 No. 692. IEICE Technical Report, Japan, by the Institute of Electronics Information and Communication Engineers, Feb. 25, 2005, vol. 104 No. 692. pp. 125-130.

* cited by examiner

Logic 360

Database 362

SERVER LEGITIMACY ENGINE 340

EXTENDED ONE-TIME PASSWORD METHOD AND APPARATUS

CROSS-REFERENCE TO RELATED APPLICATIONS

This patent application claims the benefit of U.S. Provisional Patent Application No. 60/707,203 filed Aug. 11, 2005 by the present inventor.

FIELD OF THE INVENTION

The present invention relates to Internet authentication, and in particular to authentication that uses a one-time password.

BACKGROUND OF THE INVENTION

Many Internet users have specific access rights to their service provider, to a corporate network, to paid services, or to their bank or credit account. For exercising their rights, such users need to authenticate themselves. The most known and commonly-used method for user authentication is based on entering a username and a password.

With the growing rate and sophistication of Internet fraud, username and password authentication is not considered safe, since the data can be easily intercepted through the communication network, and then be reused by the attacker for false representation of the original user's identity and rights.

One-time-password (hereinafter "OTP") is a common remedy, offered by various vendors, to overcome the vulnerability of the username and password scheme. It is based on using a password only for a single login or transaction, and then rendering this password useless. Any further login or transaction will require a different password. Thus, even if someone intercepts the password, it is useless for future transactions.

There are three basic methods for generating and managing a one-time password. One is to have a long list of passwords on a paper or electronic file; the second is to use software running on one's personal computer (desktop, laptop, palmtop or smart phone) to generate such passwords; the third is to use a dedicated hardware device to generate the passwords. The focus of the present invention is on such hardware devices.

FIG. 1A describes system 100 of the background art, which uses a dedicated OTP authentication device 110 (typically, a OTP "token") for generating a one-time password. Computer 160 includes processing capacity (not shown) for running client application 168 in cooperation with server application 182 running on a server 170, to obtain a target functionality, such as access to information or transactions. Client application 168 can be a dedicated program or a general purpose Web browser. Server application 182 requires approval from OTP verifier 178 in order to provide the target functionality. OTP verifier 178 is a software module devised to receive and check a (one-time) password from server application 182, which in turn has received that password from client application 168. In the configuration under consideration, that password is derived from data generated by and received from OTP authentication device 110 through authentication device interface 164. OTP authentication device 110 is a secure portable device that is carried by a user and is adapted to interface with a plurality of computer 160. The heart of OTP authentication device 110 is OTP generator 130, which is a microprocessor-based cryptographic software routine, devised to generate a one-time password based on trigger 120 and a secret user key 132 recorded in OTP authentication device 110. Typically, the OTP device 110 is constructed to be tamper-resistant or tamper-proof to prevent access to and/or tampering with the secret user key 132 data.

Trigger 120 is the element that changes from one password generation operation by OTP generator 130 to other generation sessions, and hence provides the "one-time" aspect of the password. Three common approaches in the background art for generating trigger 120 are a random challenge 120A received from server 170, a full date time string received from an accurate real-time clock 120B built into OTP authentication device 110, or a counter 120C that increments by 1 for each consecutive password generation.

Throughout this disclosure, "session OTP data" refers to data derived from trigger 120 and secret user key 132. This Session OTP data may be combined, within the OTP authentication device 110 and/or the client workstation 160 with user authentication data (i.e. password, biometric data, etc) to yield two-factor (or multi-factor) authentication data. For the specific case where the combining is effected within the OTP authentication device 110, the two-factor authentication data is itself a form of "Session OTP data." Nevertheless, there is no explicit requirement that the "Session OTP data" as provided from the OTP device 110 to the client workstation 160 be multi-factor authentication data derived from a user-provided data (i.e. password/PIN data or biometric data), as long as the Session OTP data is derived form the user key 132 and trigger 120.

Optionally and typically, user identifier (or user identification module) 134 may be provided in OTP authentication device 110 to prevent misuse by someone who finds or steals OTP authentication device 110. In many implementations, OTP generator 130 will not generate (or will not transmit) a Session OTP data unless user identifier 134 provides positive user identification.

Common ways for user identification are a small keypad for receiving a personal identification number (PIN), a biometric sensor, or a comparator for checking a PIN or other data received from computer/client workstation 160 (typically, input into client workstation 160 by a keyboard of the client workstation 160).

OTP interface 140 interfaces with authentication device interface 164 in order to exchange OTP-related data between OTP authentication device 110 and computer 160. In particular, whenever OTP generator 130 generates a session OTP, an OTP transmitter (not shown) "transmits" (i.e. displays and/or effects a data exchange to provide the session OTP data to the computer 160 via OTP interface 140) the session OTP from the OTP device 110.

Common implementations for OTP interface 140 are: a display 140A being used by a user in order to read the password and enter same manually into a keyboard that serves as authentication device interface 164 (then the preferred trigger 120 would be real-time clock 120B or counter 120C); a USB interface 140B (or other "contact" interface) that interfaces with a matching USB interface that serves as authentication device interface 164 to establish a two-way serial communication, or a IR/RF interface 140C (or other "wireless interface) that interfaces with a compatible infrared/radio frequency transceiver that serves as authentication device interface 164. In the cases of USB 140B and IR/RF interface 140C, all three approaches for trigger 120 are workable.

It will be noted that the case where OTP interface 140 applies display 140A, does not require any direct electronic communication link between OTP authentication device 110 and computer 160. In many examples, the user will enter both Session OTP data 140 read from the display 140B as well as user authentication data (i.e. for example, password and/or biometric data for the second of "two-factor" authentication) into the client workstation 160 where this data is combined to generate a two-factor authentication password (which is itself a type of OTP).

Server 170 allows server application 182 to provide a target service to client application 168 only upon the approval of OTP verifier 178. OTP verifier 178 includes processing and cryptographic means to check the password received from OTP authentication device 110 through computer 160, taking into account user key 132 and trigger 120. User key 132 is retrieved from user database 176, which includes the records of eligible users, including their username and key. The value of trigger 120 is retrieved by OTP verifier 178 from trigger synchronizer 174, which contains a challenge generator, a real time clock or a counter, corresponding to the method for trigger 120 selected from challenge 120A, real-time clock 120B and counter 120C, respectively.

FIG. 1B illustrates the same prior art system of FIG. 1A. In FIG. 1B, the deployment of the OTP authentication device 110, computer 160 (i.e. client workstation) and the server 170 are illustrated explicitly. More specifically, as illustrated in FIG. 1B, client workstation/computer 160 is connected to the wide-area network 20 through an Internet access link (for example, a broadband link, dialup link, SOHO link or any other ISP (Internet Service Provider) access link, or a cell-phone internet access link for surfing with the cellular device) with a WAN gateway 22 provided by an ISP (an ISP access point). The server 170 sends a request for a session OTP via the wide-area network 20 (typically, using a packet-switched protocol) to the client workstation 160. Upon receiving this request by the client workstation 160, the OTP authentication device 110 transmits (either automatically or by a user entering via a keyboard of the client workstation) the session OTP to the client work station 160. This session OTP data is either directly forwarded to the server 170, or is combined with authentication data (i.e. password, pin, biometric) and then sent to the server 170 via the wide-area network (i.e. Internet) 20.

FIG. 2 describes the operation of system 100 of FIGS. 1A-1B, in accordance with some background art. In a step 201, a user of computer 160 launches client application 168. Client application 168 needs to communicate and interact with server application 182 in order to provide a desired target functionality for the user, such as access to data or making transactions. In a step 221 server application 182 responds to client application 168 with a request for user authentication by an OTP. This request is transferred to OTP authentication device 110, where OTP generator 130 requests from trigger unit 120, in a step 221, a trigger for generating the OTP. If the trigger is Challenge 120A the server 170 generates in trigger synchronizer 174 a random challenge string and provides it to OTP generator 130 through computer 160; if the trigger is any of real-time clock 120B or counter 120C, it is generated autonomously within OTP authentication device 110. In a step 231, OTP generator 130 processes trigger 120 and user key 132 to generate an OTP. In a step 241, the OTP generated in step 231 is sent from OTP device 110 to client workstation 160 which forwards data derived from the OTP to server 170. In a step 251, OTP verifier 178 calculates an expected OTP based on a the trigger retrieved from trigger synchronizer 174 and the user key retrieved from user database 176, and compares it with the OTP received from OTP authentication device 110 through computer 160. If the verification was positive, then a step 261 routes the process to step 271, where a client-server session commences to provide the desired target service through cooperation between client application 168 and server application 182; if the verification was negative, then step 261 routes the procedure toward a step 281, wherein server 170 rejects the service request received from computer 160, and the user is notified by computer 160.

The system described above, which uses a typical user authentication method of the background art, focuses on the authentication of the user (that uses computer 160) by a service provider (that operates server 170). This one-way authentication method has fairly protected service providers and users from user identity theft, until a new mode of fraud, coined "phishing", was introduced and has even become a mainstream fraud method. In phishing, a user is addressed by an email message that pretends to come from his bank or a legitimate, reputable Internet commerce site. The message invites the user to update his details or conduct a commerce transaction. During this process, the user is required to authenticate himself, and the information that he provides is used by a criminal to steal the user's identity and provide other transaction on the user's behalf. The combination of username and password is extremely vulnerable to phishing, since the username and password surrendered by the users are reused for many more transactions by the criminal. The use of an OTP, dramatically reduces the effectiveness of phishing, but does not provide full protection against a phishing variation called "man in the middle". In a man-in-the-middle attack, a message from a fake site starts what looks to the user as a legitimate banking or commerce transaction. While the transaction takes place, a criminal conducts a transaction of his own with the real site. The criminal passes-through the OTP-based authentication session and then conducts a transaction that transfers money or sends merchandise to himself or his partners.

There are a number of published documents related to techniques for increasing security in an environment where there is a risk of a man-in-the-middle attack. Potentially relevant patents and published patent applications include US20010045451, US20060041759, US6141752, WO2005098630, WO06018647, and WO06062838, all of which are incorporated by reference in their entirety.

The white paper "Enhancing One-Time Passwords for Protection Against Real-Time Phishing Attacks" from RSA Security, Inc. discloses technology where an OTP device (i.e. an electronic token) is used in conjunction with the client workstation. The OTP device is either in communication with the client workstation (for example, a "contact" OTP device communicating via a USB interface where trigger-derived data is provided via the USB interface) or is used by a human user who types a trigger-derive OTP-code (i.e. trigger-derived data) into a keyboard of the client workstation. The trigger-derived OTP-code (either automatically provided or copied from a screen of the OTP token) is combined, on the client workstation, with password/PIN data input into the client workstation to provide the "two-factor" password. More specifically, instead of inputting this password/PIN data into a browser and directly sending the combined data two-factor authentication data over the internet, a software "password protection module" (PPM) (typically separate from the browser) residing on the client workstation for receiving the user password/PIN is provided. On the client workstation, the PPM module combines the user password/PIN with the OTP data provided by the OTP device token. Before sending to the server from the client workstation, the combined data is encrypted/hashed by the PPM in accordance with an identity of the requesting server. This supposedly makes it difficult for a "man-in-the-middle" to access the hashed password and to learn the OTP data and/or the two-factor authentication data and/or the user authentication data.

Even though the PPM is typically a separate application from the attack-prone browser, one shortcoming of this prior art is that the Session OTP data is always provided (by the user or through a device interface) from the typically tamper-resistant OTP device to the potentially insecure client workstation, even if there is some risk that the server requesting the OTP authentication is no legitimate.

Due to the threat of phishing and man-in-the-middle attacks, there is an ongoing need for improved methods and apparatus for protecting OTP data from access by authorized parties.

SUMMARY

The present inventor is now disclosing systems and functionalities for extending the protection offered by a one-time password (OTP) infrastructure to effectively block phishing attacks. Specifically, the present inventor is now disclosing that in may be advantageous to provide session OTP data to the client workstation only if there is some indication that server requesting the session OTP is a legitimate server. Otherwise, if there is no indication (or insufficient indication) that the server requesting the session OTP data is a legitimate server, it may be advantageous for the OTP device to withhold the session OTP data from the client workstation/terminal.

Although not an explicit requirement, in exemplary embodiments, certain functionality associated with determining whether or not the requesting server is legitimate may also be implemented within the tamper-resistant OTP device, thereby providing further protection against tampering (for example, by a cracker and/or fraudster and/or man-in-the-middle) with the mechanism for verifying the identity of the server. Alternatively or additionally, this functionality may be implemented in the client workstation.

It is now disclosed for the first time a method of handling transmission of session OTP data (for example, in accordance with a server-generated request for a session OTP). The presently disclosed method may be implemented in a system comprising a server, a client workstation in communication with the server via a wide-area network (typically, the Internet), and an OTP token interfaced with the client workstation via a device interface (i.e. via a 'contact' or a 'wireless' interface). The presently disclosed method includes the steps of (a) receiving (by either the OTP device and/or by the client workstation) from the server information at least partially identifying the server; b) determining if the identifying information is indicative of a legitimate server; and c) in accordance with the determining, deciding (i.e. effecting a decision by the OTP token and/or by the client workstation) to carry out one action selected from the group consisting of: i) transmitting, from the OTP token, data indicative of an internally-generated session OTP (i.e. a session OTP generated within the OTP token rather than within the client workstation, the session OTP generated in accordance with the trigger and the secret user key and optionally, in accordance with user authentication data); and ii) refraining from the transmitting. Only if the decision is a positive decision (i.e. a decision to transmit the data indicative of the session OTP), transmitting the data indicative of the session OTP from the OTP token.

According to some embodiments, the transmitting includes effecting an inter-device data transfer of the indicative data from the OTP token to the client workstation via the interface only if the decision is positive.

According to some embodiments, the transmitting includes displaying the data indicative of the session OTP on a display screen of the OTP token only if the decision is positive.

According to some embodiments, the data indicative of the session OTP is multi-factor authentication data derived from user authentication data.

Alternatively, the data indicative of the session OTP is independent of user authentication data.

According to some embodiments, the method further comprises: d) if the decision is a negative decision, refraining by the OTP token from generating the session OTP.

According to some embodiments, the method further comprises: d) if the decision is a negative decision: i) internally generating, within the OTP token, the session OTP; and ii) maintaining a status wherein the session OTP remains within the OTP token.

According to some embodiments, the method further comprises the step of (d) before the receiving, using an embedded security browser within the OTP token, opening a secure session between the OTP token and the server.

According to some embodiments, the method further the step of: (e) after the opening of the session, transferring a client end of the session from the OTP token to the client workstation, wherein at least one of the receiving and the determining is carried out at the client workstation.

According to some embodiments, a client terminus and/or end of the session remains at the embedded browser (i.e. the client workstation is used as a "data conduit" and the communication is managed from within the OTP device) at a time that the identifying information is received by the OTP token from the server.

According to some embodiments, the receiving is carried out by the OTP token (i.e. a browser embedded within the OTP token) via a communications link between the server and the OTP token, i.e. the OTP token is the client end of the session and the client workstation is used only as a "data conduit" and the communication is managed from within the OTP device.

According to some embodiments, the determining is carried out within the OTP token. In some embodiments, this can provide an extra measure of security due to the tamper-resistant and/or tamper-free nature of the environment within the OTP token.

According to some embodiments, the determining includes effecting a query (from the client workstation and/or from database client code residing within the OTP token) to a database residing within the OTP token.

According to some embodiments, the database is an immutable database. Thus, according to one example, a financial institution or group of financial institutions distributes OTP devices with a "white list" of legitimate servers (i.e. associated with the financial instruction or group of institutions) embedded within the device. This white list could be immutable, which, while not providing a "generic solution" may be adequate for the distributing financial institution (and/or their customers). The immutable nature of the database for authenticating the legitimacy for servers may also provide an added measure of security.

According to some embodiments, the database includes one a pre-determined list of acceptable URLs, a pre-determined list of acceptable IP addresses, and a pre-determined list of acceptable values for certificate fields.

According to some embodiments, the determining is carried out in accordance with at least one of protocol data (for example, by extracting from transmitted packet data indicative of an IP address of the server) of a received one communication and certificate data transmitted in a received communication, URL data and IP address data.

According to some embodiments, the determining is carried out in accordance with only some attributes of a certificate received from the server. Thus, in one example, a certificate has many fields, and some but not all certificate fields are used to ascertain/determine a legitimacy of the server. This may be useful in a number of exemplary scenarios, for example, where it is desired to define a "family" of servers or server parameters (thereby only 'partially' defining an identifier of the server). For example, an issuer (for example, bank or other operator of a secure server) may work with more than one certificate provider, and thus, this field may not be required to verify the certificate. For example, a bank may deploy many servers in a specific group, and certificate field data specifying which server of the group is issuing the Session OTP request may not be used, while other fields may be used. This affords the issuer (for example, the bank) flexibility to not need to completely specify the server identification parameters at a time the OTP device is issued (for example, including an immutable database).

It is noted that the "immutable database" while providing security in some situations, is not a limitation of the present invention.

In exemplary embodiments, the transmitted data is encrypted and/or hashed.

It is now disclosed for the first time a OTP token for use with a client workstation in communication with a server via a wide-area network. The presently disclosed OTP device includes: (a) a device port (i.e. one or more device ports— 'contact' oriented such as USB port and/or wireless) for receiving, from the client workstation, data including information at least partially identifying the server; b) a server legitimacy engine for determining if the information is indicative of a legitimate server, c) an OTP generator operative to generate a session OTP; and d) an OTP-transmission decision engine operative, in accordance with results of the determining, to decide to carry out one action selected from the group consisting of: i) transmitting, from the OTP token, data indicative of the session OTP; and ii) refraining from the transmitting.

In exemplary embodiments, the device further comprises c) an OTP transmitter for transmitting data indicative of a session OTP, wherein the OTP transmitter is According to some embodiments, the OTP transmitter is operative to transmit the data indicative of the session OTP to the client workstation via data port if the decision is positive.

According to some embodiments, the OTP token further comprises: d) a data display, wherein the OTP transmitter is operative to transmit the data indicative of the session OTP to the data display only if the engine determines that the identifying information is indicative of the legitimate server.

According to some embodiments, the OTP token further comprises: d) an embedded security browser embedded within the OTP token, the embedded browser operative to open a secure session between the OTP token and the server.

According to some embodiments the embedded security browser is operative to receive, during the secure session, the identifying information.

According to some embodiments the server legitimacy engine includes: d) a database of predetermined data, wherein the server legitimacy engine is operative to carry out the determining in accordance with contents of the database.

According to some embodiments, database is an immutable database. This may be useful, for example, where special OTP devices (rather than generic OTP devices) for operating with a pre-defined group of servers is distributed, and it is desired to provide added security so a fraudster and/or criminal and/or cracker cannot modify the database to add servers.

According to some embodiments, the database includes one a pre-determined list of acceptable URLs, a pre-determined list of acceptable IP addresses, and a pre-determined list of acceptable values for certificate fields.

According to some embodiments, the server legitimacy engine is operative to carry out the determining in accordance with at least one of protocol data of a communication from the server and certificate data transmitted in a communication from the server.

According to some embodiments, the server legitimacy engine is operative to carry out the determining in accordance with only some attributes of a certificate received from the server.

According to some embodiments, the OTP generator is operative to generate the Session OTP in accordance with user authentication data, thereby generating the Session OTP as multi-factor authentication data.

According to some embodiments, the device further comprises: e) a user identification module for authenticating the user authentication data.

According to some embodiments, the OTP-transmission decision engine is operative to effect the decision in accordance with results of the authenticating of the user authentication data.

It is now disclosed for the first time a system for handling transmission of Session OTP data. The presently-disclosed system comprises: a) a client workstation in communication with a server via a wide-area network, b) an OTP token interfaced with the client workstation, the OTP token including: i) a device port for interfacing with the client workstation; and ii) an OTP generator operative to generate a session OTP; and wherein at least one of the OTP token and the client workstation is operative to receive information identifying the identifying the server, the system further comprising: c) a server legitimacy engine for determining if the information is indicative of a legitimate server, the server legitimacy engine residing at least in part in at least one of the OTP token and the client workstation; d) an OTP-transmission decision engine operative, in accordance with results of the determining, to decide to carry out one action selected from the group consisting of: i) transmitting, from the OTP token, data indicative of the session OTP; and ii) refraining from the transmitting, wherein, the OTP-transmission decision engine resides at least in part in at least one of the OTP token and the client workstation.

It is now disclosed for the first time a computer readable storage medium having computer readable code embodied in the computer readable storage medium, the computer readable code comprising instructions for: a) receiving, by at least one of a client workstation in communication with a server via a wide-area network and an OTP token interfaced with the server, information at least partially identifying the server; b) determining if the identifying information is indicative of a legitimate server; and c) in accordance with the determining, deciding to carry out one action selected from the group consisting of: i) transmitting, from the OTP token, data indicative of an internally-generated session OTP; and ii) refraining from the transmitting.

These and further embodiments will be apparent from the detailed description and examples that follow.

BRIEF DESCRIPTION OF THE DRAWINGS

FIG. 3D provides a block diagram of an exemplary server legitimacy engine 340.

Figure 1A:
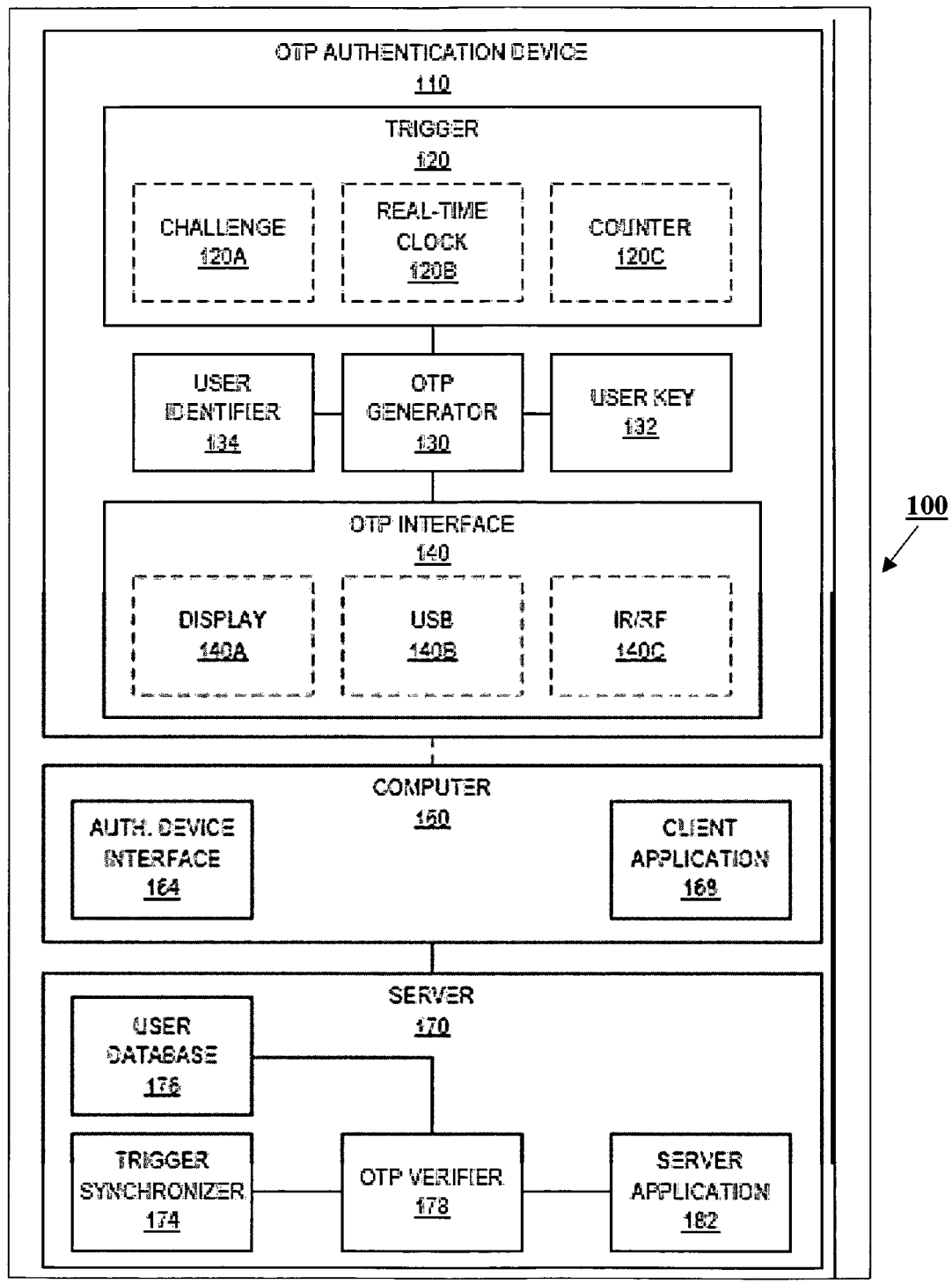
FIGS. 1A-1B (prior art) provide respective block diagrams of an exemplary system including a server 170 requesting a session OTP, a computer/client workstation 160 in communication with the server 170 via the Internet 20, and an OTP device/token 110 for use with the client workstation 160.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to"), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed apparatus, device and computer-readable code for handling session data is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first. Unless it is clear from the context to the contrary, any disclosed component of client workstation, server, or OTP token may be implemented in any combination of hardware and/or software and/or firmware.

Reference is made to FIGS. 3A-3E, which describe a system 300 constructed according to a preferred embodiment of the present invention. It is noted that certain blocks and functionalities of system 300 are similar to or identical with corresponding blocks and functionalities of system 100 of FIGS. 1A-1B. Thus, the OTP authentication device 310 of FIGS. 3A-3D includes a trigger 120 and an OTP generator 330 which generates session OTP data in accordance with the contents of a user key repository 132 and the output of trigger 120. Optionally, the session OTP data is also generated in accordance with user authentication data (for example, handled by user identifier 134). Alternatively, the session OTP data is independent of user authentication data, and only depends on the output of the trigger 120 and the contents of the user key repository 132 (typically, tamper-resistant or tamper-proof non-volatile memory in which the user key data resides).

OTP session data may be transmitted from the OTP token device 310, by OTP transmitter 342, via interface 140 to either a display screen provided as part of the display interface 140A or to the client workstation 360 via a contact interface 140B or a wireless device interface 140C.

The OTP session data is not unconditionally transferred from the OTP token 310 every time a request for a OTP session is received. Rather, the transmitting is carried out in accordance with a "go/no-go" decision effected by the OTP transmission decision engine 344. In FIGS. 3A-3E, certain components (for example, OTP transmission decision engine 344, user identifier 134, browser 350, and server legitimacy engine 340), are depicted as residing within the OTP token 310, though embodiments where one or more of these components reside in part or wholly outside of the OTP token are also contemplated by the present inventor.

The transmission decision engine 344 may carry out the aforementioned "go/no-go" transmission decision in accordance with one or more factors. Typically, the OTP token 310 will only transmit a session OTP from the secure OTP token (to a less secure client workstation 360 or a display screen) only if a server legitimacy engine 340 determines that a server identifier associated with a request for a session OTP is indicative that the requesting server 170 is likely to be legitimate (and less likely to be a fraudster or phisher or "man-in-the-middle").

Thus, with reference to FIG. 3D, it is noted that in exemplary embodiments, server legitimacy engine 340 includes database 362 and logic 360, for example, operative to "query" the database (which could be as simple as a look-up). The database includes pre-determined data indicative of "trusted server." The server legitimacy engine 340 is thus operative to verify that the present Session OTP will be made with a legitimate server, and not with a fake server that pretends to be a legitimate server as in typical phishing. The database 360 of trusted servers may be formed from records including, for each trusted server, for example, at least one of IP (Internet protocol) address, URL (uniform resource locator) or certificate data (for example, 'partial' certificate data as discussed in the summary).

In exemplary embodiments, the database is populated either by the provider of OTP authentication device 310 (e.g. a bank that provides such devices to its customers for secure sessions therewith), or through entries made by the user, or by receiving, from a trusted party, a file of trusted servers. In some embodiments, the database is immutable and configured before "shipping" of the OTP authentication token 310

Figure 1B:
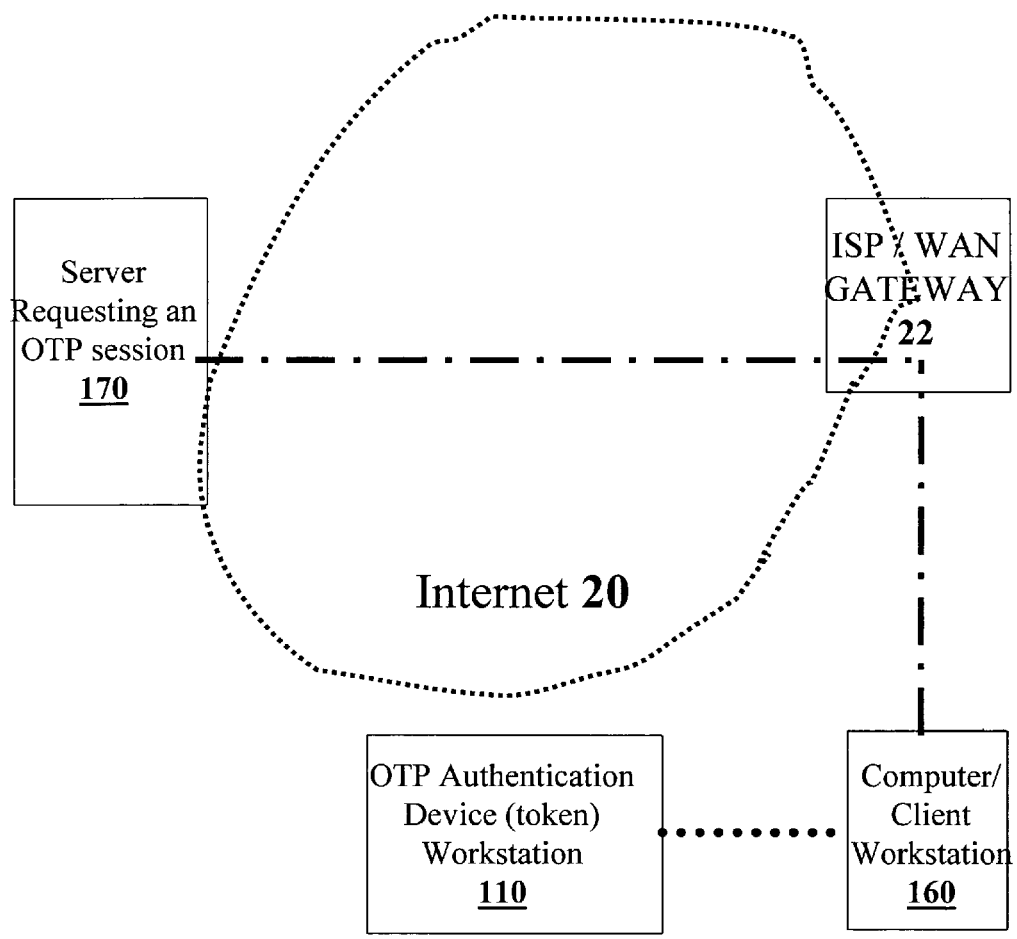
Figure 3A:
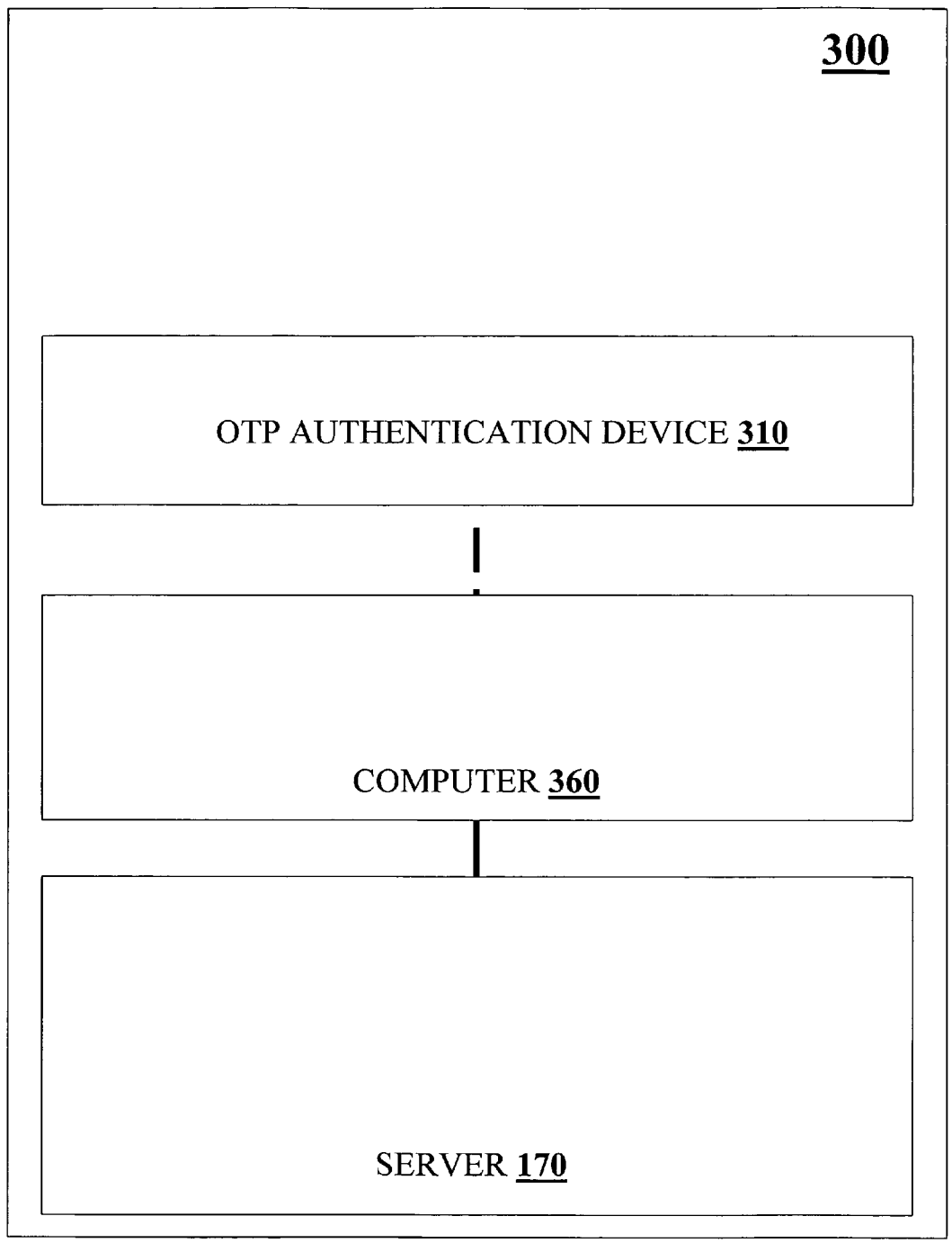
FIG. 3A-3B provide respective block diagrams of an exemplary system 300 including a server 170 requesting a session OTP, a computer/client workstation 360 in communication with the server 170 via the Internet 20, and an OTP device/token 310 for use with the client workstation 160 in accordance with some embodiments of the present invention.
Figure 3B:
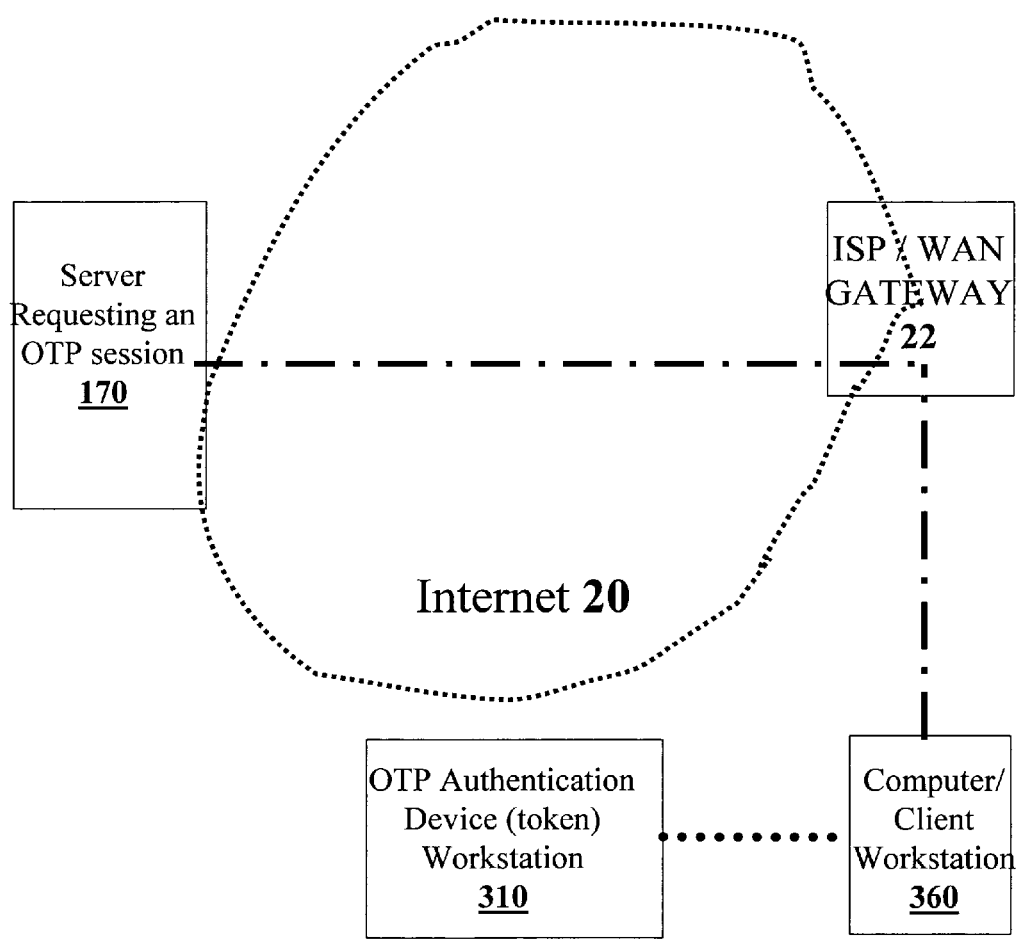
Figure 3C:
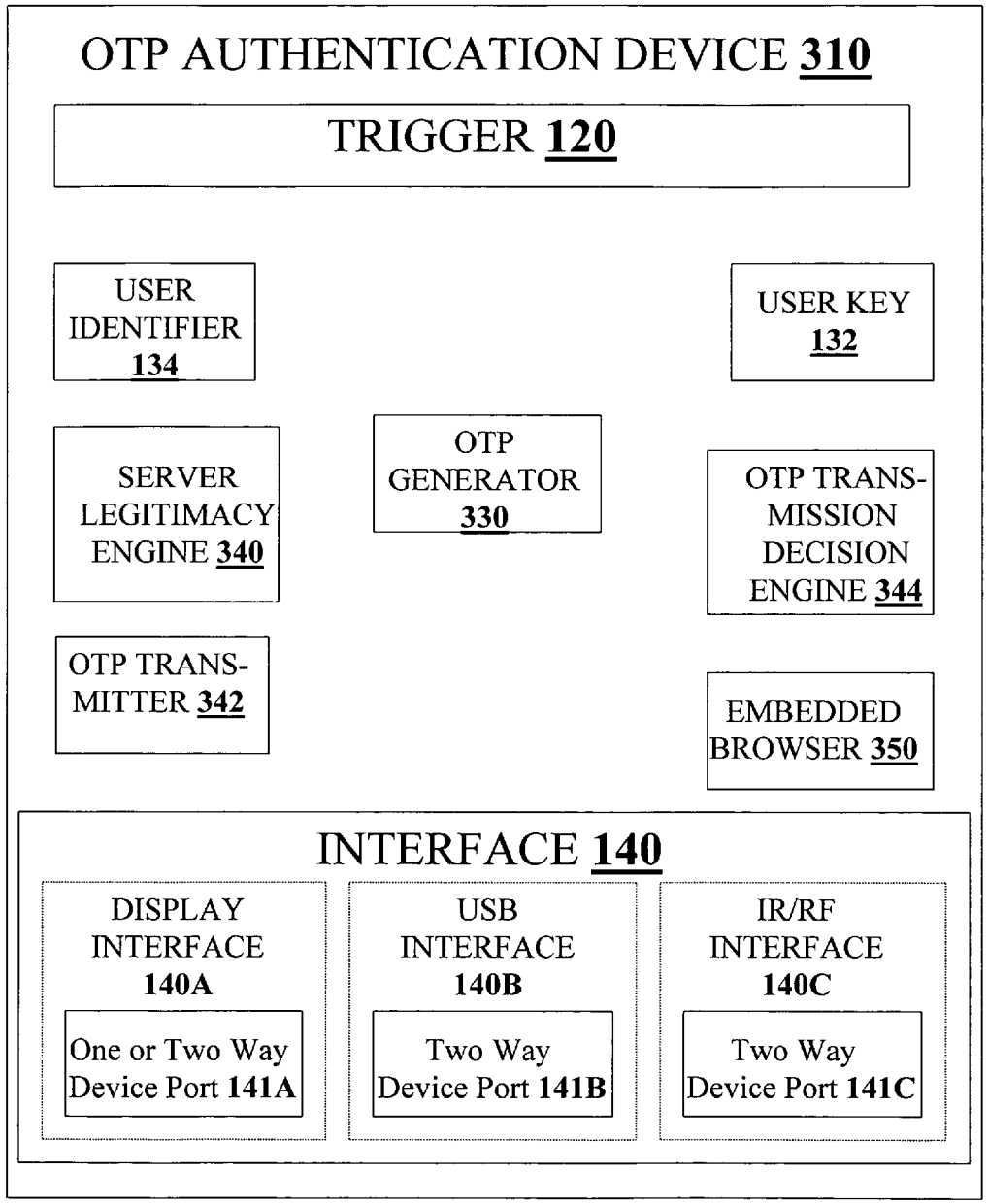
FIG. 3C provides a block diagram of an exemplary OTP authentication device/token 310.
Figure 3E:
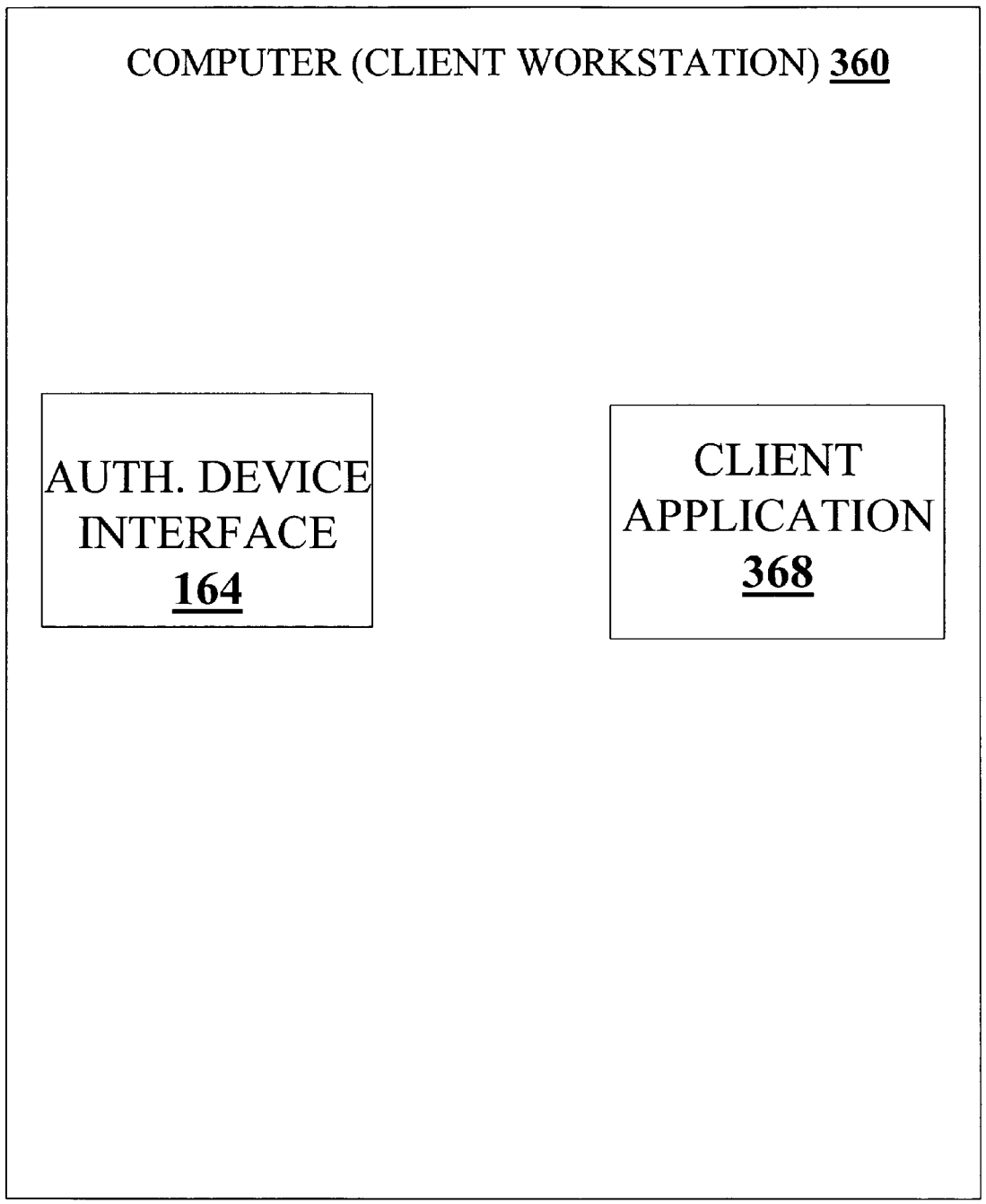
FIG. 3E provides a block diagram of an exemplary client workstation/computer 360.

Referring now to FIG. 3E, it is noted that Computer 360 (i.e. the client "workstation") may have the same authentication device interface 164 as that of computer 160 of FIGS. 1A-1B, and client application 368 may be similar to client application 168 of FIGS. 1A-1B, with an additional functionality of interrogating server 170 to retrieve its identity (using standard identification services, well-known to those skilled in the art, for identifying the IP, URL and/or certificate of a connected party) and sending that server identity as an input to server ID checker 334 of OTP authentication device 310. The present invention does not necessarily require any modifications to computer 360 or server 170. It will be noted that computer 360 (the "client workstation") can be any computerized user device used to communicate with servers 170. For example, computer 360 can be a personal desktop, laptop or palmtop computer, a cellular telephone or a two-way pager. OTP authentication device 310 is an autonomous, portable device (an electronic "token") that can be connected to more than one computer 360, and can have a variety of form factors, such as a key fob with a display, a USB token, a USB disk with token functionality, a removable card (e.g. SecureDigital, MultiMediaCard, MemoryStick, or SIM card) etc; or it can be a cellular telephone, if used in conjunction with another computer such as a personal computer.

It will be also noted that server 170 need not be "aware" of the present invention. This may provide compatibility between the presently-disclosed methods and apparatus for reducing the risk of phishing attacks existing servers 170.

Figure 2:
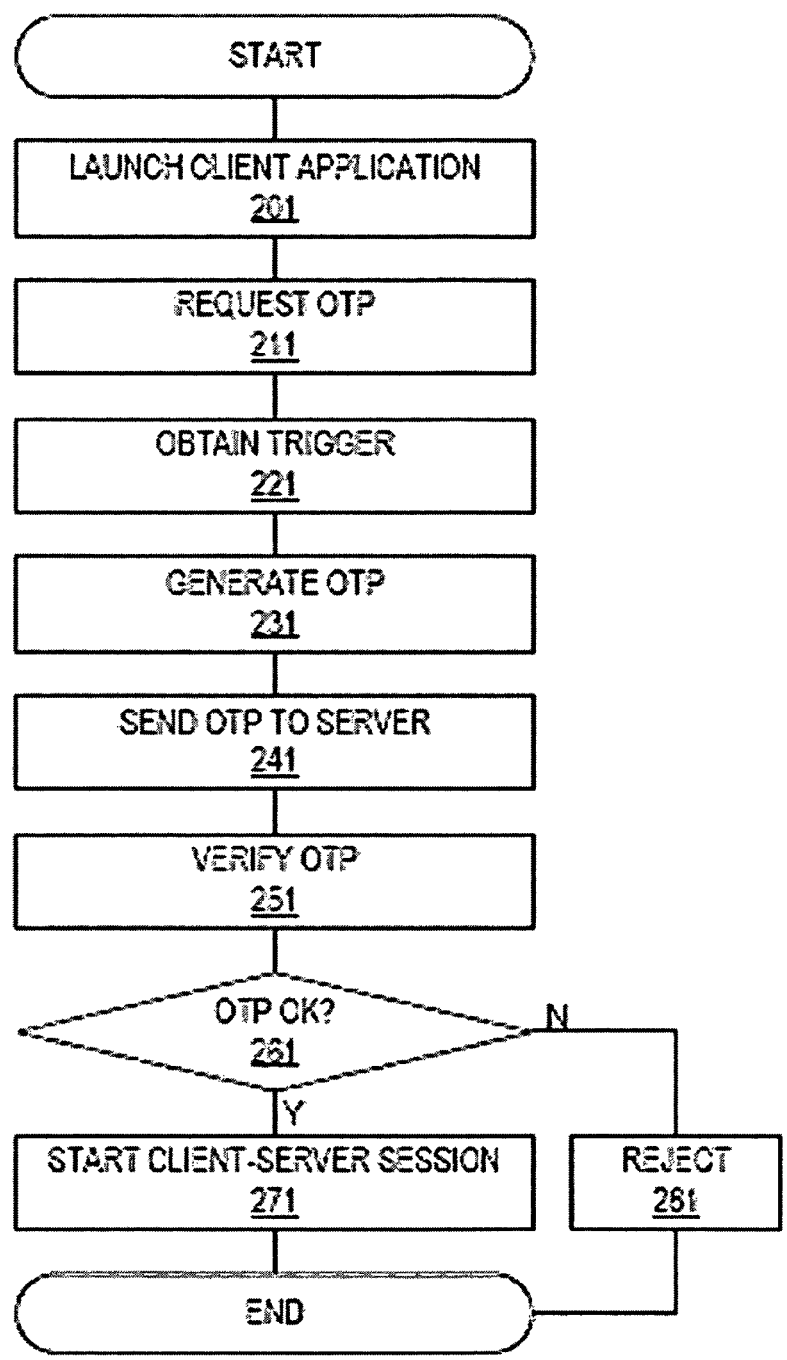
FIG. 2 provides a flow diagram of a prior art routine for starting a client-server session with an OTP generated by an OTP device 110.
Figure 4A:
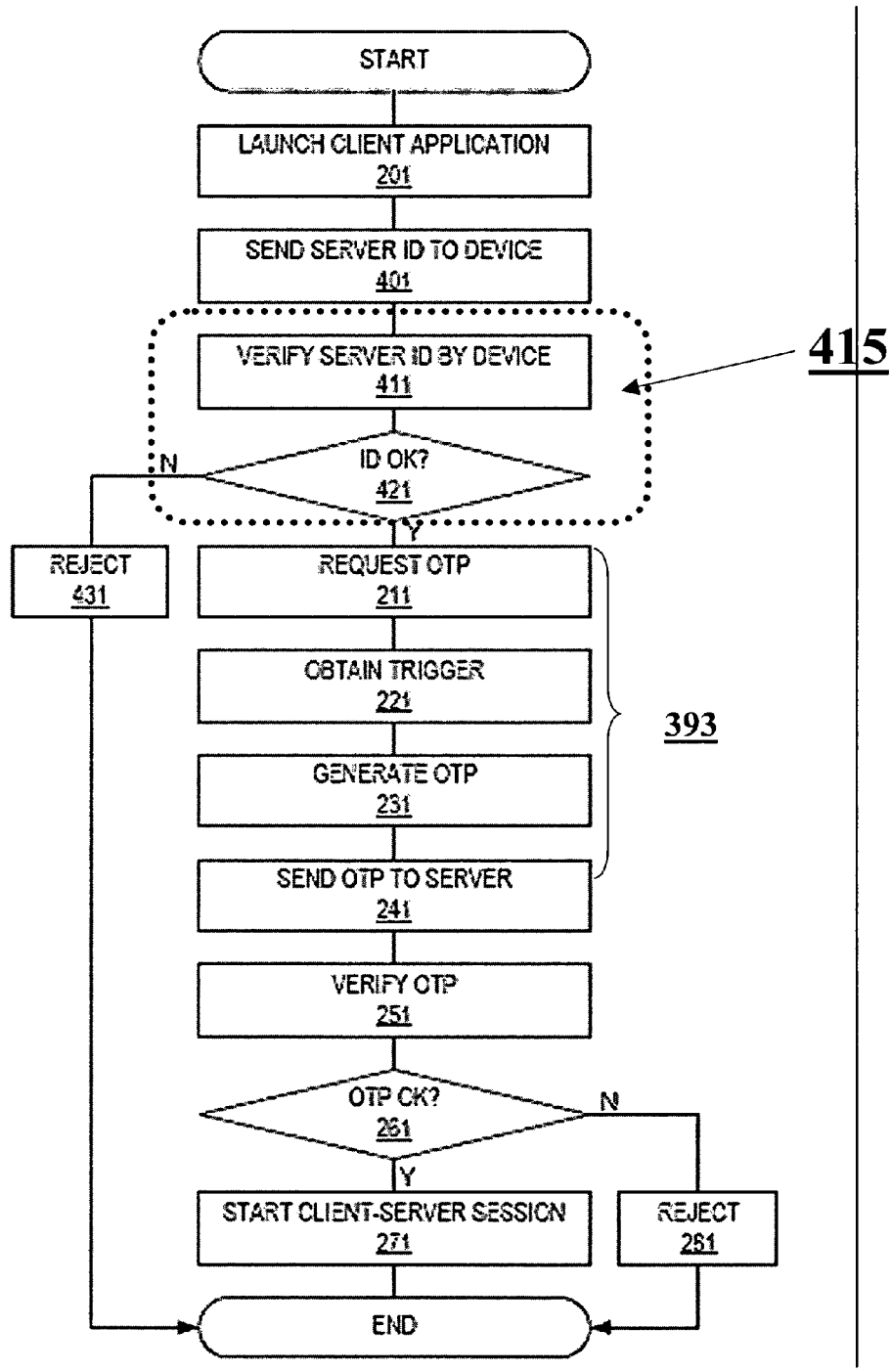
FIG. 4A provides a flow diagram of a routine for starting a client-server session with an OTP generated by an OTP device 110 in accordance with some embodiments of the present invention.

FIG. 4A describes the operation of system 300 of FIGS. 3A-3E in accordance with some embodiments of the present invention. Most of the steps are the same as in FIG. 2, with steps 401, 411, 421 and 431 added. Thus, after client application 368 is launched in step 201, then in a step 401 and under client application 368, the ID of server 170 is retrieved by computer 360 and is sent to OTP authentication device 310 to be verified in a step 411 by server ID checker 334, against a database of legitimate servers that forms part of server ID checker 334. If the server is positively verified, then step 421 routes the process to steps 211, 221, 231, 241, 251, 261, 271 and 281 as in FIG. 2, where an OTP is generated by OTP generator 330 of OTP authentication device 310 and verified by server 170 as a precondition for running a client-server session. If is step 411 the verification ends up negatively, then step 421 routes the process toward rejection at a step 431, wherein OTP generator 330 of OTP authentication device 310 will not generate a valid OTP, and the procedure will be terminated by either client application 368 or server application 182.

It will be noted that since the configuration of FIGS. 3 and 4 requires two-way communication with OTP authentication device 310, the use of USB 140B or IR/RF interface 140C is preferable. If however OTP interface 140 uses display 140A with no communication link between OTP authentication device 310 and computer 360, then the entry of the server ID will make a manual input device, such as a keypad (that can also be used for PIN entry for user identifier 134), mandatory in OTP authentication device 310. Thus, in this case, the user will be prompted by a message on the display of computer 360 to key-in a server ID, shown within the message, into OTP authentication device 310 and then key-in the OTP shown on Display 140A into computer 360.

Figure 4B:
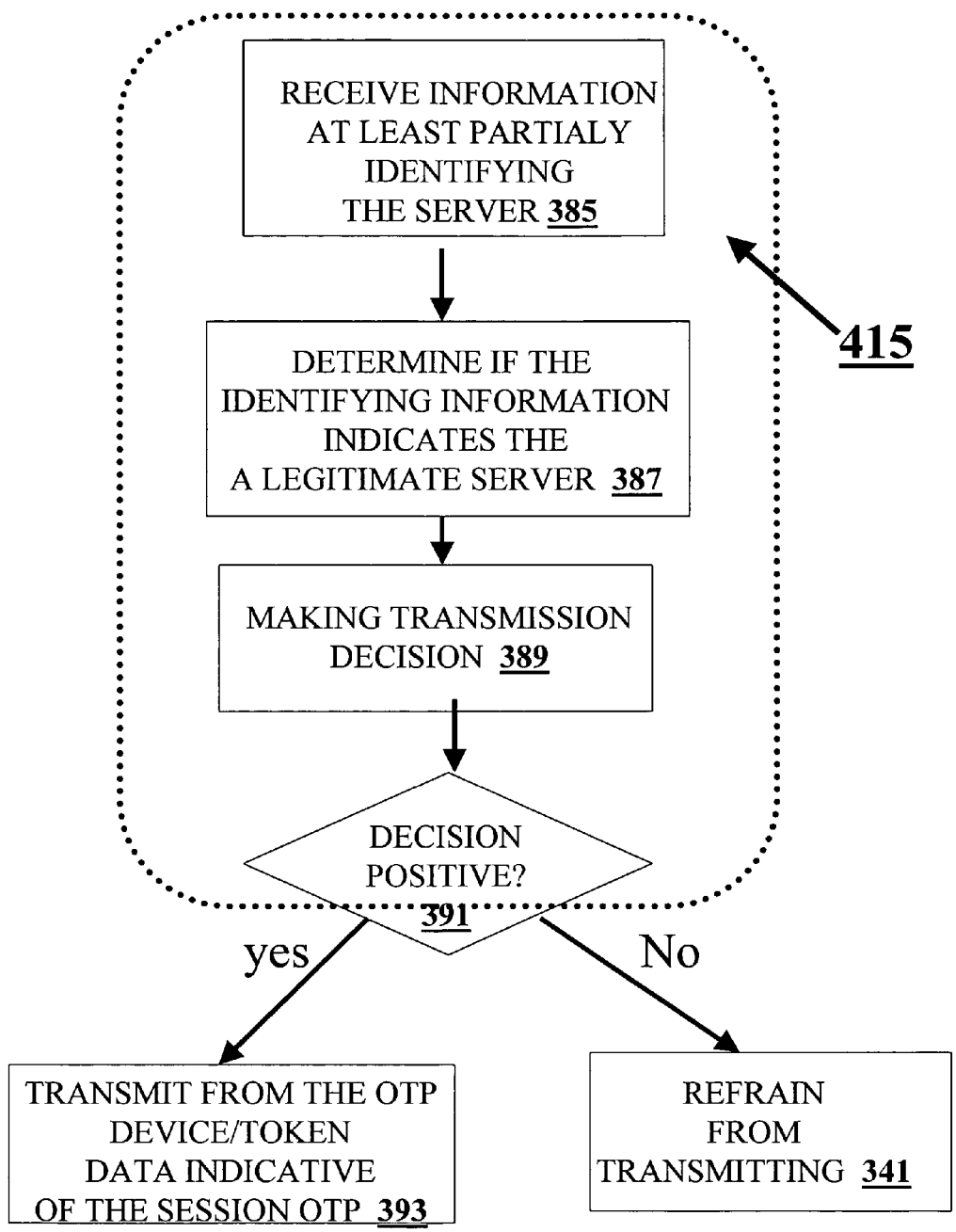
FIG. 4B provides a flow diagram of a routine for handling session OTP transmission from the OTP token.

FIG. 4B describes a sub-routine of the exemplary authentication routine described in FIG. 4A. Thus, it is noted that routine 4B may be carried out in the context of authentication routines other than that described in FIG. 4B.

Referring to FIG. 4B, first 385 information is received (at the OTP device 110 and/or the client workstation 160) that at least partially identifies the server. Then, a determination is made 387 (for example, by server legitimacy engine 340) if the identifying information indicates a legitimate server 387 (i.e. if server 170 is more likely to be legitimate/trusted/genuine). In accordance with the results of his determining, a "go/no go" transmission decision 389 (for transmitting OTP session data to the less secure client workstation—NOT necessarily a decision about transmitting OTP session data via the wide-area-network to the server 170) is made (e.g. by the OTP transmission decision engine 344). In the event 391 of a positive decision (i.e. to transmit), the data indicative of the OTP session is "transmitted" (i.e. either via a device interface or a display screen). Otherwise, these is a refraining 431 from transmitting the OTP session data to the less secure environment "outside" of the OTP token 310.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to". The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method for handling a session one-time-password ("OTP") transmission with an OTP token, the OTP token in communication with a server and a client workstation via a network, the method comprising:
   an OTP token opening, with an embedded security browser at the OTP token, a secure session between the OTP token and a server;
   receiving, at the OTP token, after opening the secure session, server information that at least partially identifies the server, wherein the server information is received from the server;
   determining whether the server is legitimate based on the received server information;
   in response to determining that the server is legitimate:
      transmitting, from the OTP token, data of an internally-generated OTP; and
      initiating, with the OTP token, a client-server session with the server; and in response to determining that the server is not legitimate:
      refraining from transmitting, from the OTP token, data of an internally-generated OTP.

2. The method of claim 1, wherein the data of an internally-generated OTP is of a session OTP and transmitting said data from the OTP token to the client workstation is done via a device interface.

3. The method of claim 1, wherein transmitting data of an internally-generated session OTP comprises:
   displaying the data of the session OTP on a display screen of the OTP token.

4. The method of claim 1, wherein the data of an internally-generated session OTP comprises multi-factor authentication data derived based at least in part on user authentication data.

5. The method of claim 1, wherein the data of an internally-generated session OTP is not derived from user authentication data.

6. The method of claim 1, further comprising:
in response to determining that the server is not legitimate:
internally generating the session OTP within the OTP token;
maintaining a status wherein the session OTP remains within the OTP token.

7. The method of claim 1, further comprising:
transferring a client end of the secure session from the OTP token to a client workstation after opening the secure session,
wherein the client workstation performs at least one of receiving server information that at least partially identifies the server and determining whether the server is a legitimate server based on the received server information.

8. The method of claim 1, wherein the server information that at least partially identifies the server is received at the OTP token and a client end of the secure session remains at the embedded browser at a time that the server information is received by the OTP token from the server.

9. The method of claim 1, wherein the receiving is carried out by the OTP token via a communications link between the server and the OTP token.

10. The method of claim 1, wherein the determination of whether the server is a legitimate server is carried out within the OTP token.

11. The method of claim 1, wherein the determination of whether the server is a legitimate server comprises querying a database residing within the OTP token.

12. The method of claim 11, wherein the client workstation queries the database.

13. The method of claim 11, wherein the OTP token determines whether the server is a legitimate server a client code residing within the OTP token causes the OTP token to query the database.

14. The method of claim 11, wherein the database comprises an immutable database.

15. The method of claim 11, wherein the database includes one of a pre-determined list of acceptable URLs, a pre-determined list of acceptable IP addresses, or a pre-determined list of acceptable values for certificate fields.

16. A method for handling a session one-time-password ("OTP") transmission with an OTP token, the OTP token in communication with a server and a client workstation via a network, the method comprising:
receiving, at an OTP token, server information that at least partially identifies a server, wherein the server information is received from the server;
determining whether the server is legitimate based on the received server information;
in response to determining that the server is legitimate:
transmitting, from the OTP token, data of an internally-generated OTP; and
initiating, with the OTP token, a client-server session with the server; and in response to determining that the server is not legitimate:
refraining from transmitting, from the OTP token, data of an internally-generated OTP;
wherein the determination of whether the server is legitimate is carried out in accordance with at least one of protocol data of a received communication, certificate data transmitted in a received communication, IP address data, or URL data.

17. The method of claim 16, wherein the determination of whether the server is legitimate is carried out in accordance with only some attributes of a certificate received from the server.

18. A one-time-password ("OTP") token for use with a client workstation in communication with a server via a network, the OTP token comprising:
a manual input device for inputting information at least partially identifying a server;
a server legitimacy engine for determining whether the server is legitimate based on the information;
an OTP generator operative to generate a session OTP;
an OTP-transmission decision engine operative to decide whether to transmit, from the OTP token, data of the session OTP in response to a determination that the server is legitimate or whether to refrain from transmitting the data of the session OTP in response to a determination that the server is not legitimate; and
an embedded security browser embedded within the OTP token, the embedded browser operative to open a security session between the OTP token and the server.

19. The OTP token of claim 18, further comprising:
an OTP transmitter for transmitting data indicative of the session OTP from the OTP token in accordance with the determination of the OTP-transmission decision engine.

20. The OTP token of claim 19, further comprising:
a device port, wherein the OTP transmitter is operative to cause an inter-device data transfer, via the device port, of the data of the session OTP only upon a determination that the server is legitimate.

21. The OTP token of claim 19, further comprising:
a data display, wherein the OTP transmitter is operative to transmit the data of the session OTP to the data display only upon a determination that the server is legitimate.

22. The OTP token of claim 18, wherein the embedded security browser is operative to receive, during the secure session, the information at least partially identifying the server.

23. The OTP token of claim 18, wherein the server legitimacy engine includes:
a database of predetermined data, wherein the server legitimacy engine is operative to determine whether the server is legitimate based on the contents of the database.

24. The OTP token of claim 23, wherein the database comprises an immutable database.

25. The OTP token of claim 23, wherein the database includes one of a pre-determined list of acceptable URLs, a pre-determined list of acceptable IP addresses, or a pre-determined list of acceptable values for certificate fields.

26. A one-time-password ("OTP") token for use with a client workstation in communication with a server via a network, the OTP token comprising:
a manual input device for inputting information at least partially identifying a server;
a server legitimacy engine for determining whether the server is legitimate based on the information;
an OTP generator operative to generate a session OTP; and
an OTP-transmission decision engine operative to decide whether to transmit, from the OTP token, data of the session OTP in response to a determination that the server is legitimate or whether to refrain from transmitting the data of the session OTP in response to a determination that the server is not legitimate;
wherein the server legitimacy engine is operative to determine whether the server is legitimate based on at least one of protocol data of a communication from the server certificate data transmitted in a communication from the server, IP address data, or URL data.

27. The OTP token of claim 26, wherein the server legitimacy engine is operative to determine whether the server is a legitimate server in accordance with only some attributes of a certificate received from the server.

28. A one-time-password ("OTP") token for use with a client workstation in communication with a server via a network, the OTP token comprising:
- a manual input device for inputting information at least partially identifying a server;
- a server legitimacy engine for determining whether the server is legitimate based on the information;
- an OTP generator operative to generate a session OTP; and
- an OTP-transmission decision engine operative to decide whether to transmit, from the OTP token, data of the session OTP in response to a determination that the server is legitimate or whether to refrain from transmitting the data of the session OTP in response to a determination that the server is not legitimate;
- wherein the OTP generator is operative to generate the session OTP in accordance with user authentication data, thereby generating the session OTP as multi-factor authentication data.

29. The OTP token of claim 28, further comprising:
- a user identification module for authenticating the user authentication data.

30. The OTP token of claim 29, wherein the OTP-transmission decision engine is operative to determine whether to transmit data of the session OTP or refrain from transmitting data of the session OTP based on the authentication of the authentication data.

* * * * *